Oct. 26, 1937.   J. E. KIRK   2,097,331
CULTIVATOR
Filed Nov. 30, 1936   2 Sheets-Sheet 1
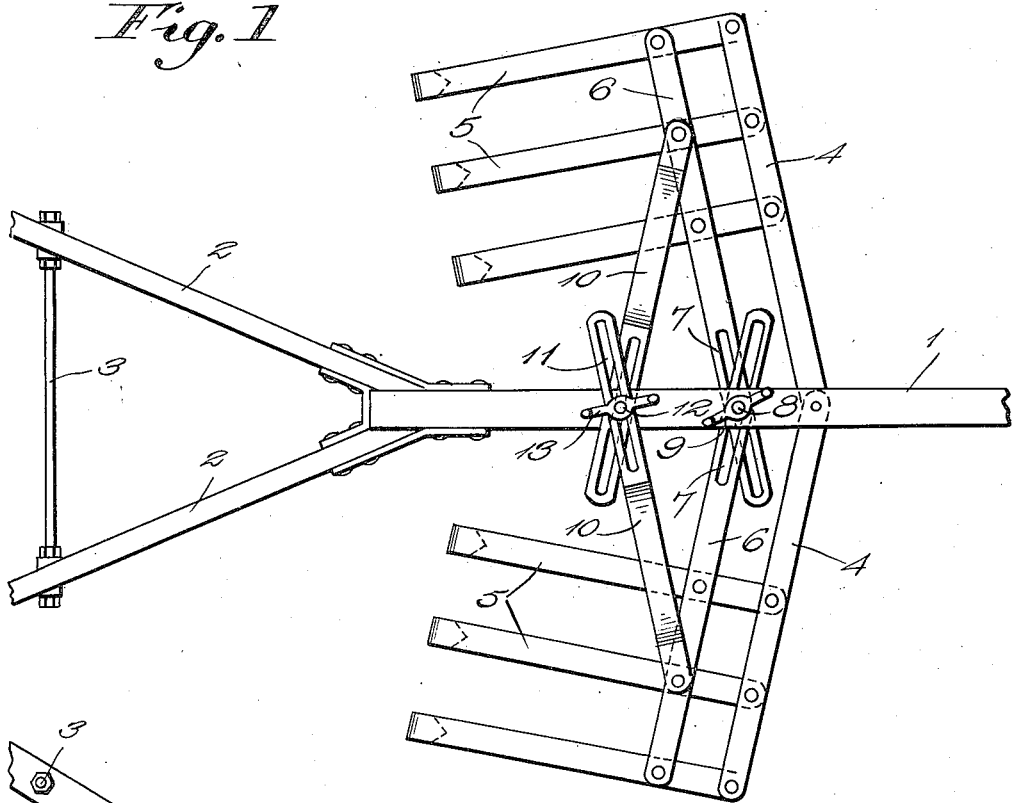
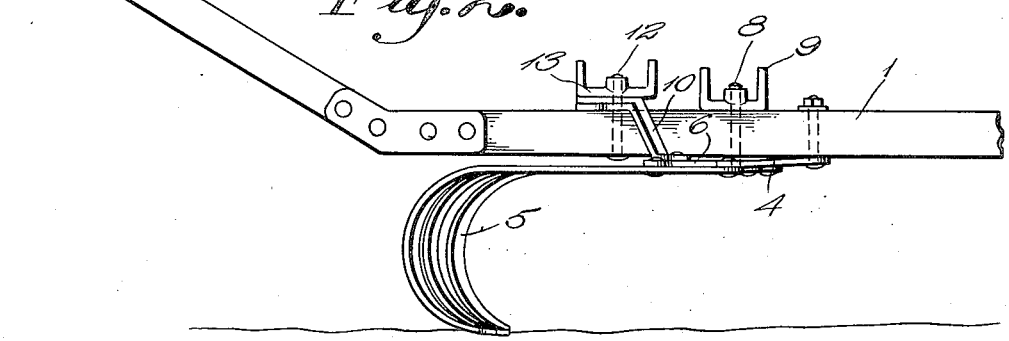
James E. Kirk
INVENTOR
BY Victor J. Evans & Co.
ATTORNEYS
WITNESS Oct. 26, 1937.   J. E. KIRK   2,097,331
CULTIVATOR
Filed Nov. 30, 1936   2 Sheets-Sheet 2
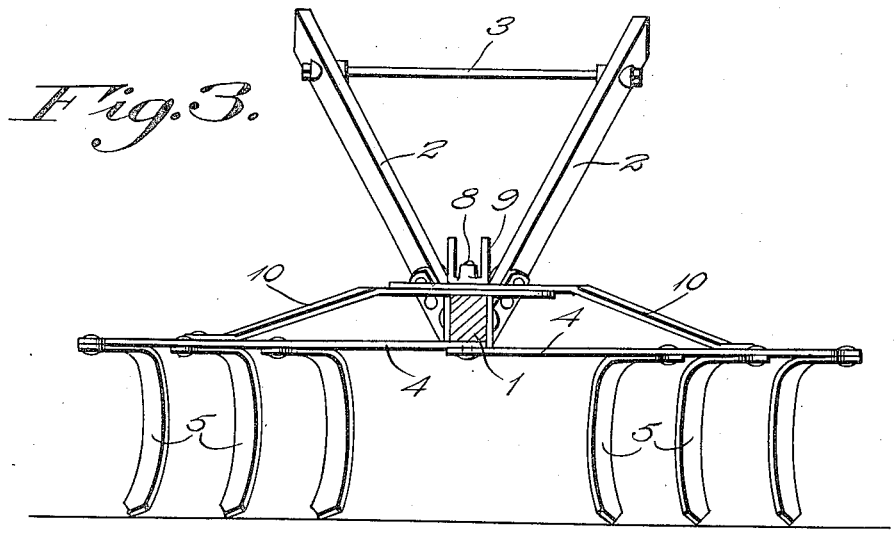
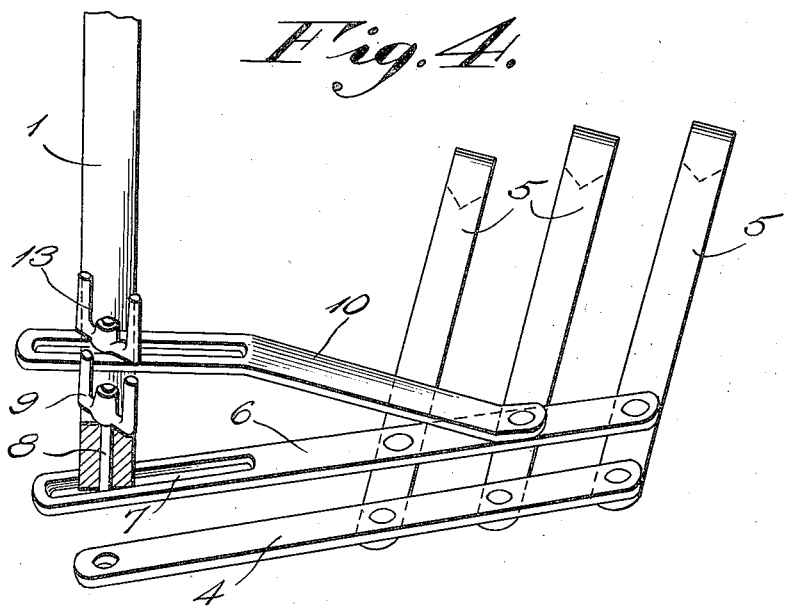
James E. Kirk
INVENTOR
BY Victor J. Evans & Co.
ATTORNEYS
R. E. Wise
WITNESS Patented Oct. 26, 1937

2,097,331

UNITED STATES PATENT OFFICE 2,097,331

CULTIVATOR

James E. Kirk, Rockmart, Ga., assignor of one-half to J. L. Eaves, Buchanan, Ga.

Application November 30, 1936, Serial No. 113,486

1 Claim. (Cl. 97—175)

This invention relates to cultivators and of the straddle row type and has for the primary object the provision of means whereby the angle of the teeth of the cultivaor and with respect to the line of draft of said cultivator may be easily and quickly varied to either direct dirt towards or from the row of vegetation and which also varies the pitch of the teeth with respect to the line of draft With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary top plan view illustrating a cultivator constructed in accordance with this invention.

Figure 2 is a fragmentary side elevation illustrating the same.

Figure 3 is a transverse sectional view showing the teeth of the cultivator adjusted for directing dirt towards a row of vegetation.

Figure 4 is a fragmentary perspective view showing means of adjusting the teeth.

Referring in detail to the drawings, the numeral 1 indicates a cultivator beam having secured to its rear end handles 2 which are connected by a brace 3. Pivoted to the beam 1 forwardly of the handles 2 are oppositely extending teeth supporting arms 4 each having secured thereto a group of teeth 5. The teeth of each group parallel each other. Connected to the teeth reardwardly of the arms 4 are adjusting arms 6 each provided with a slot 7 adjacent one end. The slotted ends of the auxiliary arms overlap and have extending therethrough a bolt 8 which also extends through the beam 1 and has threaded thereon a wing nut 9. Thus it will be seen that the auxiliary arms can be adjusted relative to the beam 1. Braces 10 are pivoted to the auxiliary arms 6 and have slotted ends 11 arranged in overlapped relation with a bolt 12 extending therethrough. The bolt 12 also extends through the beam 1 and has threaded thereon a wing nut 13. The braces cooperate with the auxiliary arms in maintaining the groups of teeth in their adjusted positions with respect to the beam. The braces 10 are offset so that their slotted ends may overlie the beam while the slotted ends of the auxiliary arms and the pivoted ends of the arms 4 underlie the beam 1.

By releasing the nuts on the bolts the groups of teeth may be adjusted at various inclinations with respect to the beam or the line of draft of the cultivator. The adjustment of the groups of teeth also varies the pitch of the teeth. The adjustment of the teeth as before described can be such as to either direct dirt towards or from the row of vegetation being cultivated by this device.

Having described the invention, I claim:

A cultivator comprising a beam, handles connected to the beam, arms pivoted to the beam and extending in opposite directions, groups of teeth secured to said arms, auxiliary arms secured to the groups of teeth and having slotted portions arranged in overlapped relation, a fastener extending through the beam and the slotted portions of the auxiliary arms, braces connected to the auxiliary arms and having slotted portions arranged in overlapped relation, and a fastener extending through the beam and the slotted portions of the braces.

JAMES E. KIRK.